(12) United States Patent
Unger

(10) Patent No.: US 8,310,113 B2
(45) Date of Patent: Nov. 13, 2012

(54) MULTIPLE ARMATURE LINEAR MOTOR/ALTERNATOR HAVING MAGNETIC SPRING WITH NO FRINGE FIELDS AND INCREASED POWER OUTPUT

(75) Inventor: Reuven Z-M Unger, Athens, OH (US)

(73) Assignee: Sunpower, Inc., Athens, OH (US)

( * ) Notice: Subject to any disclaimer, the term of this patent is extended or adjusted under 35 U.S.C. 154(b) by 632 days.

(21) Appl. No.: 12/610,587

(22) Filed: Nov. 2, 2009

(65) Prior Publication Data

US 2010/0109450 A1 May 6, 2010

Related U.S. Application Data

(60) Provisional application No. 61/111,030, filed on Nov. 4, 2008.

(51) Int. Cl.
*H02K 33/00* (2006.01)
(52) U.S. Cl. ....... 310/30; 310/15; 310/12.15; 310/12.25
(58) Field of Classification Search .................... 310/15, 310/30, 12.15, 12.24, 12.25
See application file for complete search history.

(56) References Cited

U.S. PATENT DOCUMENTS

| 4,602,174 | A | | 7/1986 | Redlich | |
|---|---|---|---|---|---|
| 4,623,808 | A | | 11/1986 | Beale et al. | |
| 5,148,066 | A | * | 9/1992 | Beale et al. | ...................... 310/17 |
| 5,175,457 | A | * | 12/1992 | Vincent | ........................... 310/15 |
| 2004/0012270 | A1 | * | 1/2004 | Kwon et al. | .................... 310/15 |
| 2008/0203829 | A1 | * | 8/2008 | Matsumoto et al. | ............ 310/15 |
| 2010/0109450 | A1 | * | 5/2010 | Unger | ............................. 310/30 |
| 2010/0141055 | A1 | * | 6/2010 | Miyahara et al. | ............... 310/30 |

* cited by examiner

*Primary Examiner* — Quyen Leung
*Assistant Examiner* — David Scheuermann
(74) *Attorney, Agent, or Firm* — Frank H. Foster; Kremblas & Foster

(57) ABSTRACT

An electromagnetic, reciprocating linear motor or alternator having at least two armatures that are adjacent along an axis of reciprocation. The armatures have gaps that are linearly aligned along a gap path parallel to the axis. Field magnets reciprocate within the gap path. The field magnets include a main field magnet associated with each armature, each main field magnet having a magnetic polarization in the same direction across the gap path. A secondary magnet provides a centering spring force and is interposed between the main magnets. The secondary magnet extends in an axial direction from within a gap of one armature core to within an adjacent gap of an adjacent armature core. The secondary magnet is magnetically polarized in a direction opposite the polarization of the main magnets.

9 Claims, 2 Drawing Sheets

Fig. 1
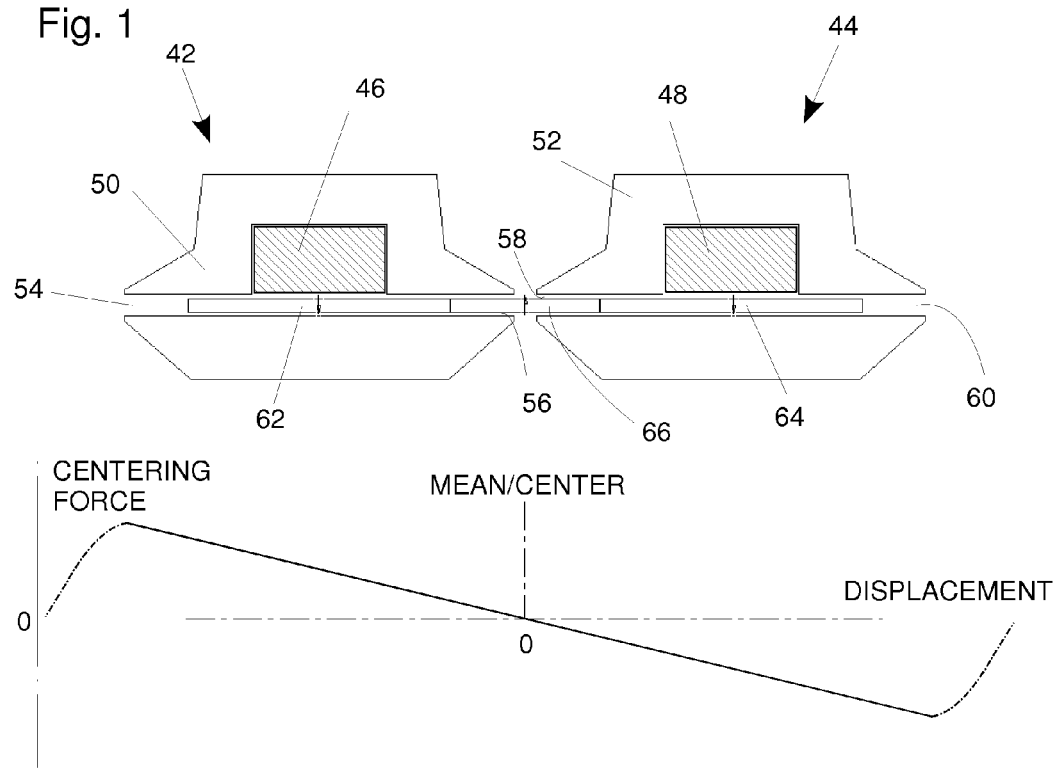
Fig. 2
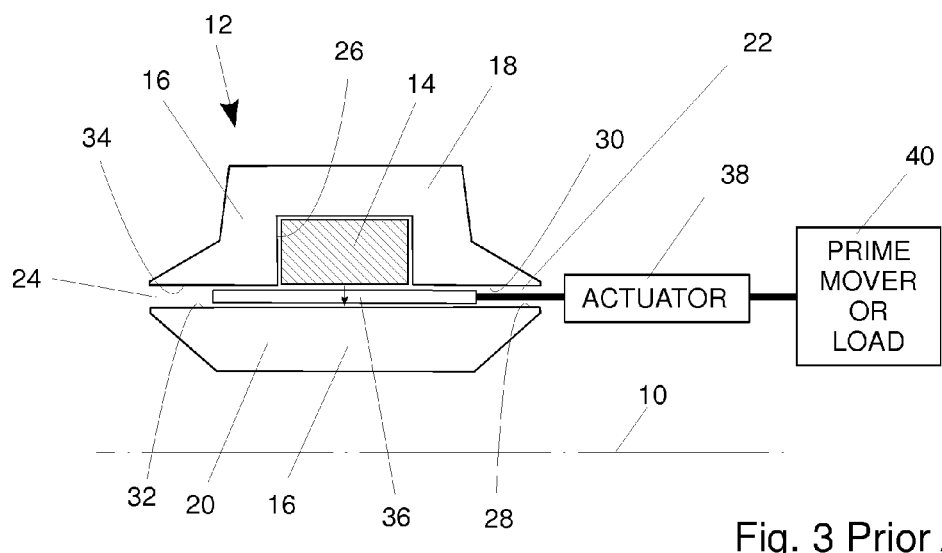
Fig. 3 Prior Art

MULTIPLE ARMATURE LINEAR MOTOR/ALTERNATOR HAVING MAGNETIC SPRING WITH NO FRINGE FIELDS AND INCREASED POWER OUTPUT

CROSS-REFERENCES TO RELATED APPLICATIONS

This application claims the benefit of U.S. Provisional Application No. 61/111,030 filed 4 Nov. 2008. The above prior application is hereby incorporated by reference.

STATEMENT REGARDING FEDERALLY-SPONSORED RESEARCH AND DEVELOPMENT (Not applicable)

REFERENCE TO AN APPENDIX (Not applicable)

BACKGROUND OF THE INVENTION

1. Field of the Invention

This invention relates generally to electromagnetic-mechanical transducers for driving a load or being driven by a prime mover and more particularly relates to reciprocating linear motors and reciprocating linear alternators 2. Description of the Related Art Reciprocating linear alternators are used for generating electrical power when driven by any of a variety of prime movers, including Stirling engines, and linear motors are used for driving a variety of mechanical loads when powered by an AC power source Like rotating motors, generators and alternators, such linear motors and linear alternators are essentially identical in that they both have the same basic components and the difference is the way they are connected and operated. Therefore, they are referred to collectively as linear motor/alternators.

The prior art includes a basic linear motor/alternator of the type illustrated in FIG. 3 and also described in U.S. Pat. No. 4,602,174, which is hereby incorporated by reference, and U.S. Pat. No. 4,623,808 which is hereby incorporated by reference. Although a linear motor/alternator can be constructed in a variety of configurations known in the prior art, the preferred configuration is an axisymmetric configuration in which an actuator carrying permanent magnets reciprocates along an axis of reciprocation within an armature. The permanent magnets are mounted to the reciprocating actuator in a cylindrical arrangement that is concentric with the axis. The main part of the armature core and the armature coil or winding are also mounted in a concentric cylindrical arrangement around the magnets and are mounted to a frame so they remain stationary. The remainder of the core completes the flux loop formed by the core and is also mounted to the stationary frame in a cylindrical arrangement. That remainder of the core is spaced inwardly from the principal part of the core to form linearly aligned gaps in the high reluctance flux path of the core. The linearly aligned gaps are parallel to the axis The magnets (or a circular magnet) reciprocate within the gaps formed in the core. The armature can be a series of individual armatures spaced around a circle in the cylindrical configuration or it can be a circular armature with a circular coil in a circular slot. Similarly, the magnets can be discrete magnets placed side by side in a cylindrical arrangement or a circular magnet. As another alternative known in the art, the coil can be wound around a leg of the core. In all these alternative configurations, time-varying magnetic flux in the core induces a current in the coil and current in the coil induces magnetic flux in the core. These configurations are illustrated and described in the above two cited patents and in U.S. Pat. No. 5,148,066 which is herein incorporated by reference.

FIG. 3 illustrates the basic components of a prior art linear motor/alternator. For an axisymmetric linear motor/alternator, FIG. 3 is a cross sectional view in a plane on which the axis of reciprocation 10 lies and along one radial from that axis. The cross sectional view of these basic components along the opposite radial and in the same plane is a mirror image of FIG. 3, which is therefore not duplicated.

Referring to FIG. 3, an armature 12 has an associated armature coil 14 and an associated core 16. The armature coil 14 is wound in a circular configuration that is concentric with the axis 10. The core 16 forms a low reluctance magnetic flux loop that consists of a u-shaped principal part 18 and a remaining part 20, both constructed of laminations of iron or other high permeability material as well known in the art. The core loop has a pair of spaced gaps 22 and 24 that are parallel to the axis 10 of reciprocation and separated from each other by an armature winding slot 26. Each of the gaps 22 and 24 are defined by two opposed pole faces which are pole faces 28 and 30 defining gap 22 and pole faces 32 and 34 defining gap 24.

The gaps 22 and 24 are linearly aligned along a gap path parallel to the axis so that a field magnet 36 that is associated with the armature 12 can reciprocate in an axial direction within the gaps 22 and 24. The field magnet 36 is mounted to a reciprocatable actuator 38 which carries all magnets so that the magnets reciprocate within the gap path of gaps 22 and 24. The field magnet 36 is polarized across the gaps 22 and 24 preferably perpendicular to the pole faces 28-34 as shown by the arrow drawn on the center of the magnet 36. The actuator 38 is drivingly connected to a prime mover or load 40, depending upon whether the linear motor/alternator of FIG. 3 is used as a linear alternator or as a linear motor. As the magnet 36 reciprocates to alternately enter between the gap 22 and the gap 24, the magnetic flux in the core resulting from the magnet 36 alternately reverses. Because the magnetic flux path through the core extends through the armature coil and varies with time, an EMF is induced into the coil and current in the coil generates a magnetic flux in the core that applies a force to the magnets in the manner well known to those skilled in the art.

The linear motor/alternator structures described above give suitable performance for many applications of a linear motor/alternator. However, for some applications, it is desirable that a spring force be applied to the reciprocating actuator. For example, if the linear motor/alternator is driven by a free-piston Stirling engine or drives a free-piston Stirling cooler, a spring force that is applied in a direction toward centering the actuator is desirable for maintaining the axial mean position of such a free-piston machine at a selected center position because such Stirling machines have a tendency for their mean position to drift away from the nominal centered position. As another example, it is sometimes desirable for the actuator of a linear motor/alternator and its load or prime mover to reciprocate in a resonant system, which requires a spring. As yet another example, if the reciprocation of the actuator and its load or prime mover has a component that is vertical, it is sometimes desirable to provide a centering spring force on the actuator to resist the force of gravity and prevent the actuator from moving to the lowest limit of excursion from its mean position.

Mechanical springs can and have been used for this purpose. However, mechanical springs have some detrimental characteristics. U.S. Pat. No. 5,148,066, cited above, discloses a way to introduce a magnetic spring force into the linear motor/alternator. As described in that patent, a pair of smaller secondary magnets are placed on opposite sides of the main magnet and are polarized oppositely to the main magnet. These secondary magnets cause a centering force to be exerted on the reciprocating actuator whenever one of the secondary magnets extends outwardly from between the pole faces that define one of their two gaps. Because the centering spring force is applied to the actuator only when a secondary magnet moves out of a gap, the secondary magnets extend from the main magnet all the way to the outer edge of their respective gaps. That way there is no dead zone, around the mean centered position, in which there is no spring force applied to the actuator tending to return the actuator to its mean position. The combination of the three magnets illustrated and described in U.S. Pat. No. 5,148,066 extend from the outer edge of one gap to the opposite outer edge of the other gap. When the actuator is moved, one secondary magnet is displaced out of the gap between the pole faces and causes a force that is applied in a direction toward centering the magnet and that has a magnitude that is proportional to its displacement out of the gap.

However, problems result from the fact that one of the secondary magnets is essentially always moving outside of the gap so that a spring force will be applied to the actuator without power production. The purpose, object and feature of the present invention is to eliminate those problems. The first problem is that the contribution of the secondary magnets to the generation of electric power in an alternator or to the application of a motor driving power in a motor is diminished the more the secondary magnets extend out from a gap into the air. The reason is that the air has a very low permeability and consequently the flux in the core from the secondary magnets is relatively small. The second problem arises because the alternating reciprocation of the secondary magnets from within a gap to a position extending out from its gap creates a time-varying magnetic fringe field outside the pole faces. This alternating magnetic fringe field is coupled to surrounding ferromagnetic materials and induces eddy currents in those ferromagnetic materials producing resistive electrical losses. Additionally, the same alternating fringe fields are coupled to nearby conductors which interferes with electrical currents in those conductors.

BRIEF SUMMARY OF THE INVENTION

The invention is an electromagnetic, reciprocating linear motor or alternator having at least two armatures that are adjacent along an axis of reciprocation. Field magnets mounted to an actuator include not only main field magnets, each main field magnet associated with an armature, but also a secondary magnet interposed between the main magnets and extending in an axial direction from within a gap of one armature core to within an adjacent gap of an adjacent armature core. Each secondary magnet is magnetically polarized in a direction opposite the polarization of the main magnets. No fringe fields are created because no magnet is displaced enough to extend out of the gaps into the air during reciprocation and the secondary magnets contribute to the power of the linear motor alternator because the secondary magnets always reciprocate in and out of the gaps of adjacent armature cores.

BRIEF DESCRIPTION OF THE SEVERAL VIEWS OF THE DRAWINGS

FIG. 1 is a diagrammatic view in radial section of a preferred embodiment of the invention taken along any radial from the axis of reciprocation.

FIG. 2 is a graph illustrating the centering force applied in the present invention as a function of actuator displacement.

FIG. 3 is a diagrammatic view in radial section of a prior art linear motor/alternator.

Figure 4:
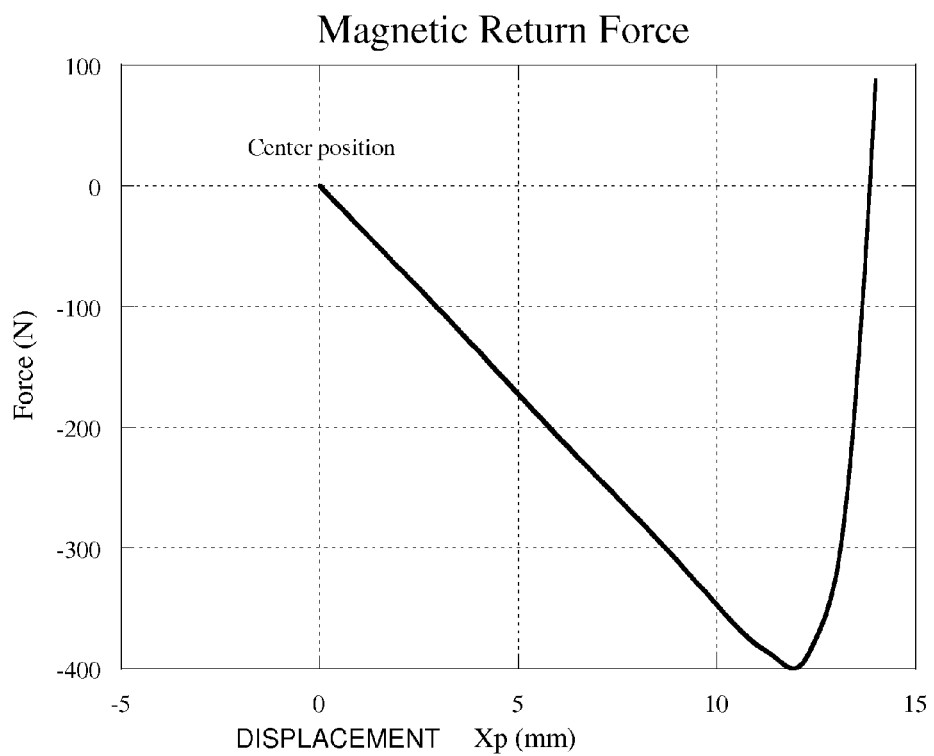
FIG. 4 is a graph illustrating a practical example of the centering force applied in the present invention as a function of actuator displacement.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art.

DETAILED DESCRIPTION OF THE INVENTION

FIG. 1 illustrates the components of an electromagnetic, reciprocating linear motor or alternator that are relevant to an embodiment of the invention. At least two armatures 42 and 44 are mounted adjacent to each other along an axis of reciprocation in the manner of the single armature of FIG. 3. Each armature is like the single armature of FIG. 3 but, in the invention, there are two or more armatures that are mounted adjacent to each other. Each armature has an associated armature winding 46 and 48 and an associated core 50 and 52 respectively, each forming a low reluctance magnetic flux loop. Each flux loop of each core has a pair of spaced gaps that are aligned parallel to the axis and separated by an armature winding slot. The armature 42 has gaps 54 and 56 and the armature 44 has gaps 58 and 60 with each gap defined by two opposed pole faces in the manner illustrated in FIG. 3. The gaps of the adjacent armatures are linearly aligned along a gap path parallel to the axis so that field magnets can reciprocate along the gap path. The embodiment of FIG. 1 also has a reciprocatable actuator which is ordinarily attached to a prime mover or load in the same manner as illustrated in FIG. 3 and reciprocates along an axis of reciprocation. The actuator and its load or prime mover are not shown in FIG. 1 in order to avoid reducing the size of FIG. 1. As is typical for a linear motor/alternator, the linear motor/alternator of FIG. 1 has a nominal design reciprocation stroke and a mean position. Stroke is the magnitude (length) of reciprocating motion of the actuator, analogous to the displacement from top-dead-center to bottom dead center of a piston. Mean position of the actuator, and therefore of its field magnets, is the center between the extremes of the actuator's reciprocation.

The two armatures 42 and 44 are described as adjacent, which means they are side by side and nearby. Preferably, the armatures and their cores do not touch at their pole faces but rather have a small space between their pole faces. Because the permeability of iron is three orders of magnitude greater than the permeability of air, the armatures can be, and preferably are, positioned very close together without much magnetic coupling from one armature to the other. They can, however, contact each other but this will cause a small degradation in performance resulting from magnetic coupling from one core to the other. They can also be spaced farther apart but that needlessly extends the length of the linear motor/alternator. So the preferred distance between them is an engineering tradeoff judgment between minimizing the degradation of magnetic coupling and minimizing the length and compactness of the linear motor/alternator.

The linear motor/alternator of FIG. 1 also has field magnets mounted to the actuator for reciprocation within the gap path in the manner that the magnet 36 of FIG. 3 reciprocates. The field magnets of FIG. 1 include a plurality of main field magnets 62 and 64 each of which is associated with one of the armatures. Each of the main field magnets 62 and 64 extend in an axial direction from within one gap of its associated core to within the other gap of its associated core. The main field magnets 62 and 64 have a magnetic polarization in the same direction across the gap path as illustrated by the direction of the arrows shown at the center of the field magnets 62 and 64.

Critically important to the invention is the placement of a secondary magnet 66 between the main magnets 62 and 64. Like the main magnets 62 and 64, the secondary magnet 66 also extends in an axial direction and is mechanically mounted to the actuator for reciprocation with the main magnets within the gap path. The secondary magnet 66 is interposed between the main magnets 62 and 64 and extends from within the gap 56 of one core to within the adjacent gap 58 of the adjacent core. Importantly, the secondary magnet 66 is magnetically polarized in a direction opposite the polarization of the main magnets 62 and 64.

In order to maximize the effectiveness of the invention, it is preferred to design the length of the magnets in the axial direction so that they have desired relationships to the nominal design stroke and distances to the gap edges. When the actuator is in its mean position, the distance from each axially opposite edge of each main magnet to the nearest outer edge of its associated gap is preferably slightly less than one half the nominal design stroke. This assures that the main magnets do not reciprocate out of their associated gaps when the actuator reciprocates within its design stroke limit. That relationship prevents fringe fields at the outer edges of the gaps and confines the magnetic flux from the main magnets to the cores where the magnetic flux can be coupled to the armature coils.

It is also desirable that the axial length of each secondary magnet is greater than the nominal design stroke. That relationship assures that the edge of the secondary magnet also does not move out of a gap and cause fringe fields at the gap edge. That relationship also assures that the spring force resulting from the secondary magnet is maintained in a linear relationship to actuator displacement. If an edge of the secondary magnet moves out of a gap between the pole faces, the spring force is substantially and non-linearly reduced.

Although undesirable as described above, the cores of the adjacent armatures can be spaced apart including a substantial distance. In order to prevent the inner edges of the secondary magnet from moving out of a gap, the axial length of each secondary magnet should be slightly greater than the sum of the nominal design stroke and the distance the cores are spaced apart, i.e. the distance between the cores and their gaps.

In order to maximize the flux variations with time in the cores, it is preferred that, when the actuator is in its mean position, each main magnet extends in an axial direction from substantially the middle of one gap of its associated core to substantially the middle of the other gap of its associated core.

In order to maximize the magnitude of the centering force applied by the secondary magnet, it is preferable that each secondary magnet extends in an axial direction substantially to the main magnets between which the secondary magnet is interposed.

These relationships are best accomplished by making the length of the pole faces that define the gaps a little longer than the design nominal stroke. Typically, making the pole faces 10% longer, is most preferred.

As well known to those in the engineering field and in this art, departures from these preferred relationships can be made with resulting deterioration or degradation of performance. Minor departures will have only a minor effect while major departures will have a major effect.

FIG. 2 is a graph illustrating the centering magnetic spring force that is applied to the actuator in an embodiment of the invention. The spring force is zero when the magnets and actuator are centered at their mean position. Motion in either direction of reciprocation causes a centering spring force that is proportional to the displacement of the actuator and the magnets it carries.

FIG. 4 is a similar graph of the spring force for a linear motor/alternator having representative displacements $X_p$. Only half of the graph is illustrated because the other half has the same values but in the opposite direction, always toward centering the magnets.

Figure 5:
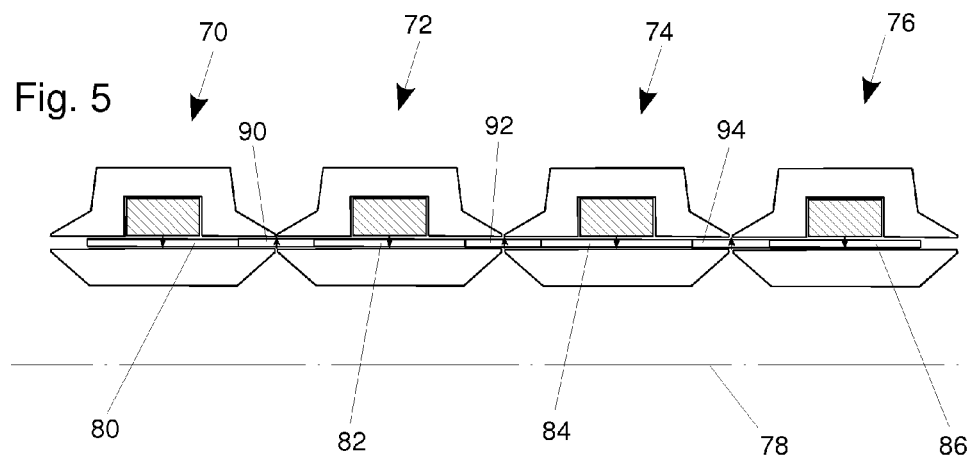
FIG. 5 is a diagrammatic view in radial section of an alternative embodiment of the invention taken along any radial from the axis of reciprocation.

Application of the invention to linear motor/alternators is not limited to two armatures with one secondary magnet as illustrated in FIG. 1. For example, FIG. 5 illustrates four armatures 70, 72, 74 and 76 that are stacked along the axis of reciprocation 78. These armatures each have an associated main magnet, 80, 82, 84 and 86 respectively, that have the characteristics described above. Secondary magnet 90, 92 and 94 are interposed between the main magnets 80, 82, 84 and 86. The invention can be implemented with two or more adjacent armatures arranged as described. In each case, the number of secondary magnets is one fewer than the number of main magnets. The invention has no end magnets that reciprocate out of a gap into the air to cause the undesirable fringe fields at the ends of the group of adjacent armatures because the only secondary magnets are between the main magnets.

An important feature of the invention is that the secondary magnet (or magnets in the case of three or more armatures) not only provides a spring force toward centering the magnets and actuator, but also contributes to the generation of power in an alternator or to the power of a motor. As known to those skilled in the art, the EMF generated in a coil is proportional to the rate of change of magnetic flux linked to the coil. Because the magnetic polarity of the secondary magnet is opposite to the polarity of the main magnets, the secondary magnet is always causing a change of flux in the same direction as the neighboring main magnet. For example, when a secondary magnet is moving into a gap, the neighboring main magnet is moving out of that gap. Consequently, the direction of flux change from the exiting main magnet is the same as the direction of flux change as that resulting from the entering secondary magnet. The flux in the direction of the main magnet is decreasing and flux in the opposite direction of the secondary magnet is increasing, both at the same time.

The centering spring force in an embodiment of the invention is not quite as strong as the centering spring force in a linear motor/alternator in which the centering magnet reciprocates out of the gap and into the air as in the invention of U.S. Pat. No. 5,148,066. However, because the secondary magnet of the present invention makes a significant and substantial contribution to power generation, the present invention provide more alternator or motor power. The present invention is particularly desirable for larger, high power motor/alternators where a lot of power is required. The use of two smaller armatures permits construction of a motor/alternator that is much smaller than a single large one. Therefore the present invention also offers an opportunity to design a linear motor/alternator with an improved aspect ratio, namely an aspect ratio that give a motor/alternator that is not so fat and allows the pressure vessel of an attached Stirling engine prime mover to have a smaller diameter which reduces the stress on a pressure vessel of the Stirling engine.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An electromagnetic, reciprocating linear motor or alternator including a reciprocatable actuator having an axis of reciprocation, a nominal design stroke and a mean position, the linear alternator or motor comprising:
   (a) at least two armatures that are adjacent along the axis, each armature having an associated armature winding and an associated core forming a low reluctance magnetic flux loop, each core loop having a pair of spaced gaps that are aligned parallel to the axis and separated by an armature winding slot, each gap defined by two opposed pole faces, the gaps of the armatures being linearly aligned along a gap path parallel to the axis; and
   (b) field magnets mounted to the actuator for reciprocation within the gap path, the field magnets including
      (i) a plurality of main field magnets, each main field magnet associated with an armature, each main field magnet extending in an axial direction from within one gap of its associated core to within the other gap of its associated core, the main field magnets having a magnetic polarization in the same direction across the gap path;
      (ii) at least one secondary magnet extending in an axial direction and mechanically mounted for reciprocation with the main magnets within the gap path, a secondary magnet being interposed between the main magnets and extending in an axial direction from within a gap of one core to within an adjacent gap of an adjacent core, each secondary magnet being magnetically polarized in a direction opposite the polarization of the main magnets.

2. A linear alternator or motor in accordance with claim 1 wherein, when the actuator is in its mean position, the distance from each axially opposite edge of each main magnet to the nearest edge of its associated gap is less than one half the nominal design stroke so that the main magnets do not reciprocate out of their associated gaps.

3. A linear alternator or motor in accordance with claim 2 wherein the axial length of each secondary magnet is greater than the nominal design stroke.

4. A linear alternator or motor in accordance with claim 3 wherein the cores of the adjacent armatures are spaced apart and the axial length of each secondary magnet is greater than the sum of the nominal design stroke and the distance the cores are spaced apart.

5. A linear alternator or motor in accordance with claim 4 wherein, when the actuator is in its mean position, each main magnet extends in an axial direction from substantially the middle of one gap of its associated core to substantially the middle of the other gap of its associated core and each secondary magnet extends in an axial direction substantially to the main magnets between which it is interposed.

6. A linear alternator or motor in accordance with claim 5 wherein the number of secondary magnets is one fewer than the number of main magnets.

7. A linear alternator or motor in accordance with claim 6 wherein there are more than two main magnets and armatures stacked along the axis.

8. A linear alternator or motor in accordance with claim 1 wherein the number of secondary magnets is one fewer than the number of main magnets.

9. A linear alternator or motor in accordance with claim 1 wherein, when the actuator is in its mean position, each main magnet extends in an axial direction from substantially the middle of one gap of its associated core to substantially the middle of the other gap of its associated core and each secondary magnet extends in an axial direction substantially to the main magnets between which it is interposed.

\* \* \* \* \*